Figure 1:
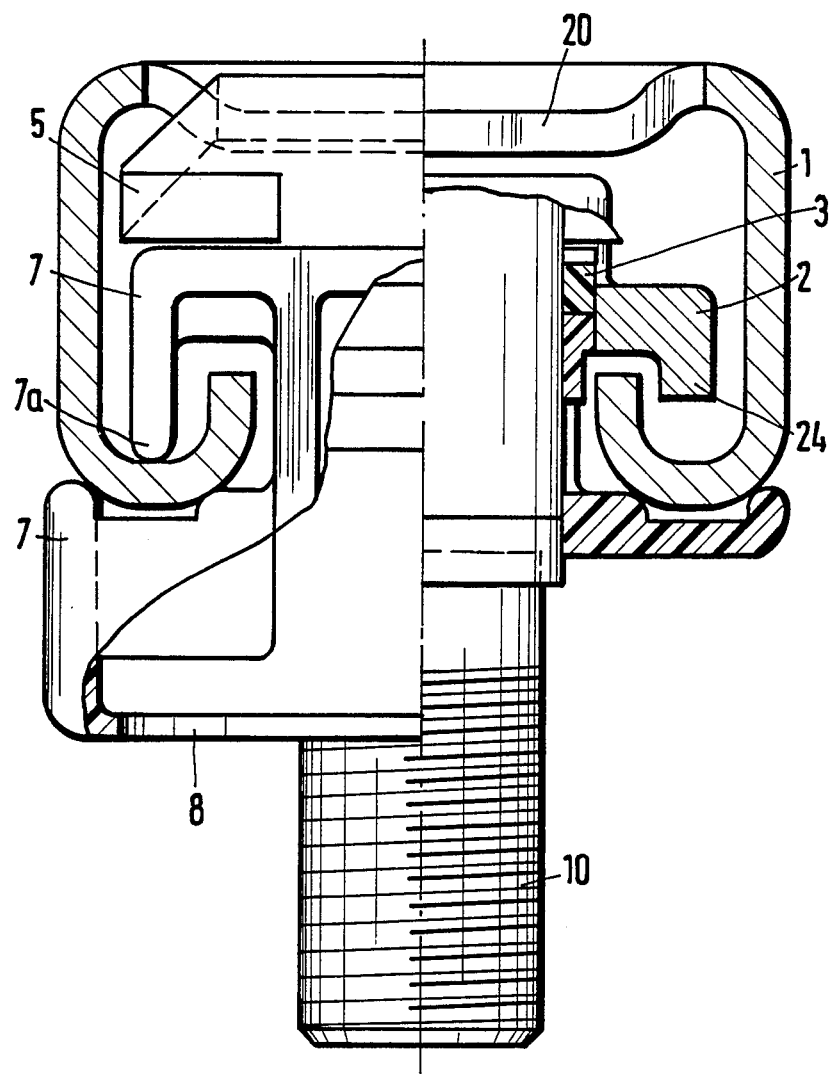

United States Patent [19]

Adomeit

[11] Patent Number: 4,711,498

[45] Date of Patent: Dec. 8, 1987

[54] HEIGHT ADJUSTING ARRANGEMENT FOR A GUIDE FITMENT OF A SAFETY BELT

[76] Inventor: Heinz-Dieter Adomeit, Grolmanstr. 16, D-1000 Berlin 12, Fed. Rep. of Germany

[21] Appl. No.: 813,741

[22] Filed: Dec. 26, 1985

[30] Foreign Application Priority Data

Dec. 29, 1984 [DE] Fed. Rep. of Germany ....... 3447817

[51] Int. Cl.$^4$ .............................................. B60R 21/10
[52] U.S. Cl. ..................................... 297/468; 280/808
[58] Field of Search ............... 297/483, 484, 486, 468; 280/801, 808

[56] References Cited

U.S. PATENT DOCUMENTS 4,398,749  8/1983  Hipp et al. ...................... 280/808 X
4,500,115  2/1985  Katsuyasu ........................... 280/808

FOREIGN PATENT DOCUMENTS 0032477  7/1981  European Pat. Off. ............ 280/801
2303222  8/1974  Fed. Rep. of Germany ...... 297/483

Primary Examiner—James T. McCall
Attorney, Agent, or Firm—Biebel, French & Nauman

[57] ABSTRACT

Described is a height adjusting arrangement for a guide fitment which is preferably provided on the door post of a motor vehicle for safety belts, having a stationary guide rail with a double-C-shaped configuration, a slide (2) which is displaceable along the slide rail and to which the guide fitment can be mounted, and a blocking element (5) which latches the slide (2) to the guide rail and which extends through an opening (11) on the slide (2).

In order that the entire arrangement is lightened and can be made up from a small number of simple components, while being satisfactorily operable, it is provided in accordance with the invention that provided on the web portion (20) which connects the C-shaped portions of the guide rail (1), in the longitudinal direction, in a row of arresting teeth (9, 9') against which the one end (21) of the blocking element (5) disposed substantially within the guide rail (1) can be engaged, and which at the other end (22) can be brought into engagement with a lock button (8), and that the slide (2) is of U-shaped cross-section, wherein the free limbs of the U-shape are guided in the respective C-shaped portion of the guide rail (1).

8 Claims, 10 Drawing Figures

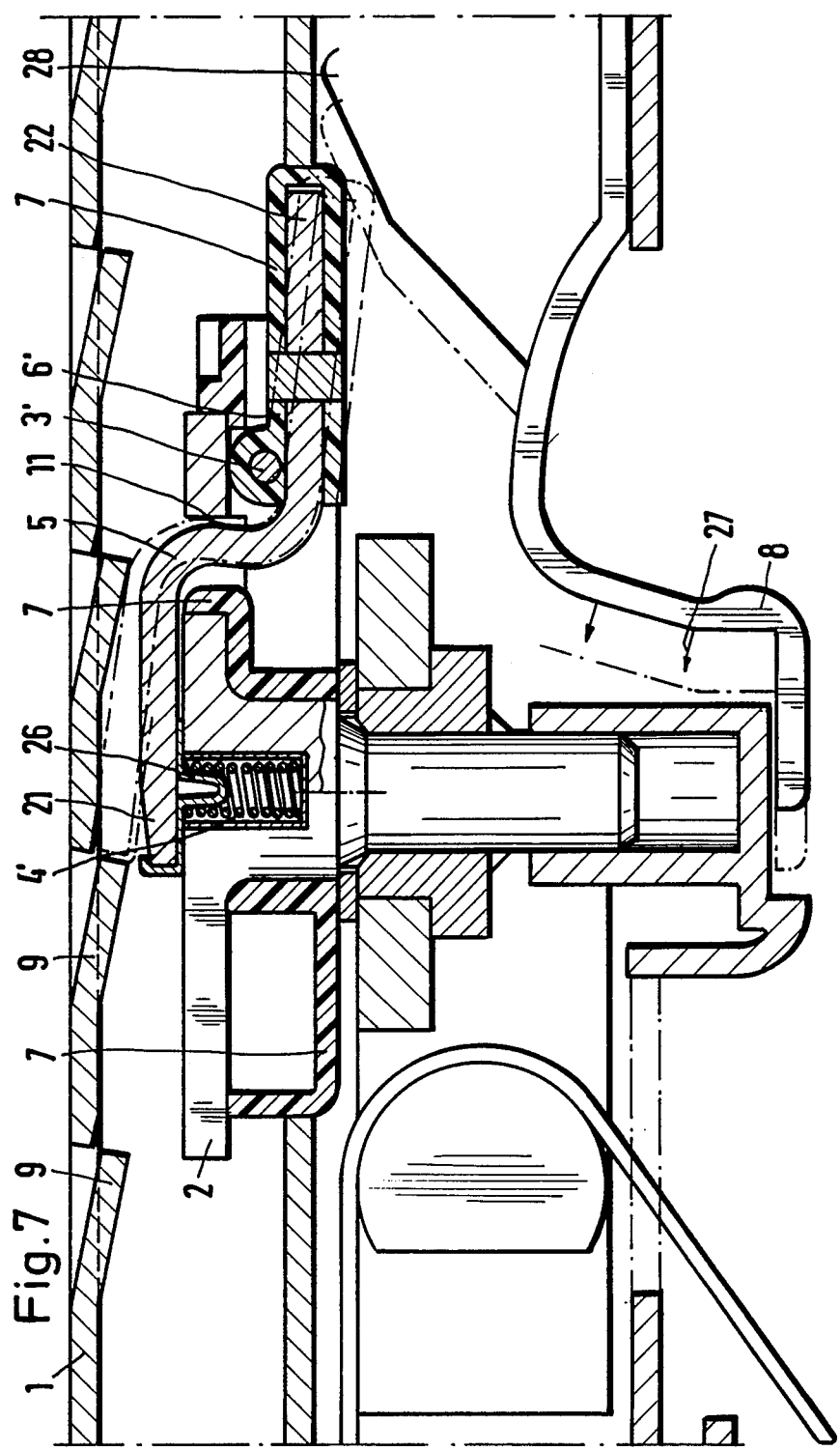

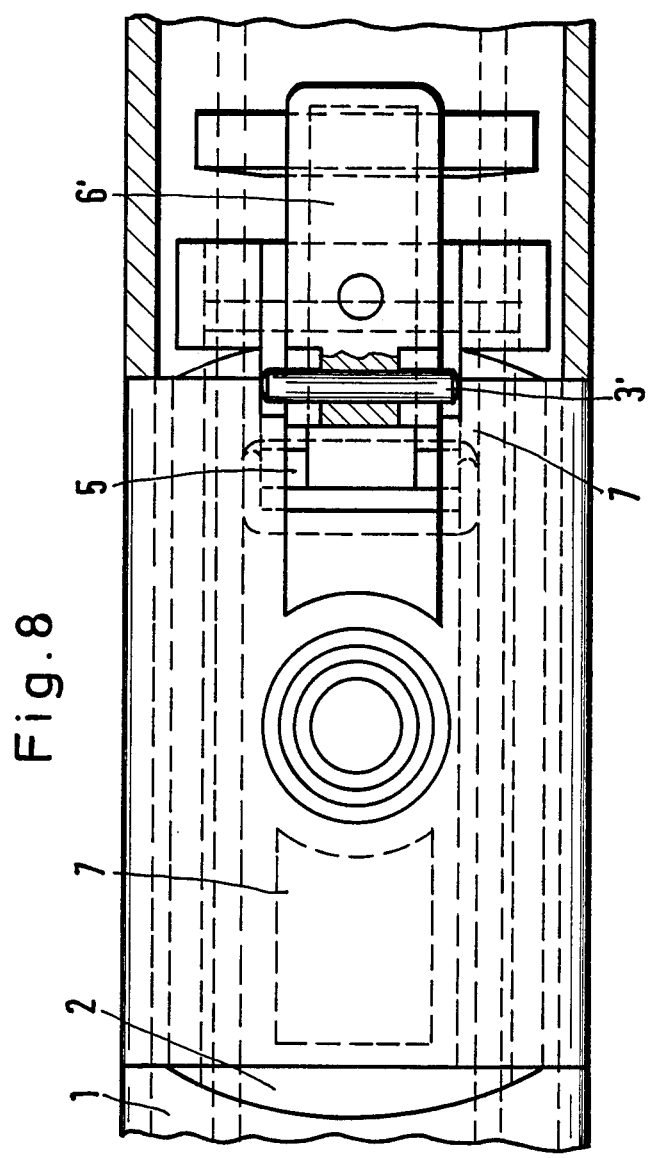

HEIGHT ADJUSTING ARRANGEMENT FOR A GUIDE FITMENT OF A SAFETY BELT

The invention relates to a height adjusting arrangement for a guide fitment which is preferably disposed on the door post of a motor vehicle for safety belts, comprising a stationary guide rail of double-C-shaped configuration, a slide which is slidable along the guide rail and to which the guide fitment can be mounted, and a blocking element which latches the slide to the guide rail and extends through an opening in the slide.

German utility model No. 84 12 788 discloses a height adjusting arrangement of that kind, with which the anchorage or direction-changing or guide fitment for the shoulder belt of a safety belt assembly is adjustable in a stepwise fashion on the middle or door post or pillar of the vehicle. The criticism is made therein that, by virtue of the pulling force applied to the guide fitment by the seat belt, the slide can automatically slip down in the guide rail so that the arrangement does not always ensure a satisfactory engagement. The known height adjusting arrangement is intended to provide that, by means of inclined run-in portions which are disposed between apertures in the guide rail, the slide, upon being pulled down, is brought into a condition of being held in position in the most closely adjacent aperture in the guide rail. The known blocking element is of a L-shaped cross-section, the free end of one leg being introduced into the respective aperture in the guide rail. At the moment of an accident, the blocking element can undergo bending due to the forces which occur, if the blocking element is not of a very strong construction. In addition, the arrangement requires a large number of individual components for displacing the slide, actuating the blocking element and pressing the components into the arresting position so that the entire adjustment arrangement is of a complicated construction, expensive, liable to trouble and heavy, although a securely held condition of the guide fitment is not guaranteed even when the blocking element engages into an aperture in the guide rail.

The invention is therefore based on the object of so improving the height adjusting arrangement of the known kind that the entire arrangement becomes lighter and is made up of a small number of simple components, while being of satisfactory operability.

According to the invention, that object is attained in that provided on the web portion which connects the C-shaped portions of the guide rail, in the longitudinal direction, is a row of arresting teeth against which the one end of the blocking element disposed substantially within the guide rail can be engaged, and which at the other end can be brought into engagement with a lock button, and that the slide is of substantially U-shaped cross-section, wherein the free limbs of the U-shape are guided in the respective C-shaped portion of the guide rail.

It will be appreciated that the guide rail, being of a double-C-shaped configuration in cross-section, has a high degree of strength which, in accordance with the invention, is utilised in a particularly advantageous fashion insofar as in the locking position the blocking element bears against an arresting tooth while in so doing remains substantially within the guide rail. In that way, the traction or compression forces at the moment of an accident are diverted approximately into the longitudinal direction of the blocking element. In that connection it is desirable for the blocking element generally to be of a greater dimension in the longitudinal direction than in the transverse direction, and for the forces to be guided in that longitudinal direction because there is then less danger of a limb which is bent through 90°, as in the case of the known L-shaped member, being buckled or bent over. In accordance with the invention therefore the blocking element does not engage into an aperture, but, at the moment of an accident, bears against the respective arresting tooth.

The fact that the blocking element remains substantially within the space defined by the guide rail, more particularly both in the blocked condition and also in the opened condition, is an aspect of particular interest whem movable operating members must be disposed practically within the adjusting rail available, for example within the structural space in the B-post of a vehicle.

The U-shaped cross-sectional configuration of the slide has the advantage, in regard to engagement with the guide rail, that under load the slide and the guide rail have the effect of hooking one into the other, in which respect the slide advantageously holds together the two limb portions of the double-C-shaped guide rail. In that way the wall thickness or gauge of the guide rail may be made thinner and thus lighter because part of the load is also carried by the slide.

The slide is a simple member which in principle may comprise a screw bolt with a large thin head plate portion. In that way the adjusting arrangement according to the invention can be made up of a small number of simple components, while ensuring a high degree of security and safety.

In another advantageous embodiment of the invention, the blocking element has two substantially straight end limbs, is shallow and Z-shaped in cross-section and is mounted pivotally in the region in which it passes through the slide. That form of the blocking element promotes diversion of the forces, at the moment of an accident, in the longitudinal direction of the element, thereby to provide support against the arresting tooth which is just in the engagement condition, while avoiding the danger of the element buckling. The Z-shaped bending of the blocking element may be such that there is virtually no danger of its buckling.

The pivotal mounting in the region in which the blocking element passes through the slide may be of various kinds. For example, a mounting shell may be disposed in the mounting region in the opening in the slide, the mounting shell pivotally mounting the blocking element in the desired fashion.

In accordance with the invention, a preferred alternative embodiment is such that the blocking element has a co-operating mounting portion through which a rotary spindle is fitted, which is supported in a further co-operating mounting portion of the guide housing on the slide. Instead of the above-mentioned mounting shell portion in the first embodiment, in this second preferred embodiment the rotary spindle may be mounted pivotally in a co-operating mounting portion, with the advantage that the blocking element, even when manufactured as a mass-produced member, is held in a geometrically defined and exact manner with not inconsiderable tolerance. The above-mentioned tolerances of the blocking element play a part for example in regard to the corresponding thickness of sheet metal, while in regard to the dimension of the blocking element in the longitudinal direction the thickness thereof may be subject to certain fluctuations within the limits of the admissible tolerances, without detrimentally affecting easily movable mounting of such a blocking element. In addition, in this embodiment the radius of bending in the operation of deforming the blocking element into the Z-shaped configuration is of only subordinate or secondary significance; that is to say, within certain ranges, the radius of bending is not a governing factor.

If the above-mentioned first alternative with the mounting shell portion is used, then it is particularly advantageous in accordance with the invention if the first radius of the blocking element, which is towards the guide rail, is at its underside a half shell portion for a mounting shell which is fitted into a slot in the slide, and if the end limb of the blocking element, which is remote from the guide rail, carries a co-operating mounting member is advantageously secured to the blocking element and bears against the above-mentioned mounting shell portion in the region in which it passes through the slide, the mounting shell portion also being disposed in the slot-shaped opening through the slide.

A preferred embodiment of the invention is also characterised in that mounted to the end of the slide which is in opposite relationship to the slot is an auxiliary tooth which sticks out towards the guide rail and which comes to lie between two arresting teeth. The auxiliary tooth is in the form of a projection and for example is formed by stamping on the slide. If at the moment of an accident the tensile or compression force attains high values, the projection in the form of the auxiliary tooth carries a part of the forces, which otherwise deforms the guide means which generally comprises plastics material of the slide, and diverts those forces to a different arresting tooth from the one against which the blocking element bears.

In accordance with the invention, it is advantageous to provide a spring which is disposed between the slide and the blocking element, for biasing the blocking element into the engaged position. The spring may be a shaped spring, a compression spring or the like, depending on the arrangement and the space available for mounting the spring. It ensures that the blocking element always endeavours to come to bear against an arresting tooth.

The slide may be displaced along the guide rail only when the blocking element is disengaged from the arresting tooth and for that purpose the arrangement uses an actuating means which acts in opposition to the biasing spring. In that connection, it is desirable in accordance with the invention if a guide housing of plastics material is arranged around the slide and has a holder for carrying the movable lock button with actuating projections which can be brought into engagement with the blocking element. When it is depressed, the lock button moves the blocking element out of engagement with the arresting tooth so that the slide is then movable. When the lock button is then released the blocking element immediately comes into detent co-operation with the most closely adjacent arresting tooth, under the force of the biasing spring. The actuating projections may be in the form of fingers which are thin and easily resiliently displaceable. By virtue of that arrangement the blocking element is turned out of the engaged position into the opened position and prevented from chattering or rattling due to vibration, while travelling, for example by a forefinger portion.

Full compensation for the inertia forces which act in front of and behind the mounting of the blocking element is advantageously possible when, in accordance with the invention, the pivotal mounting of the blocking element is arranged in the region of the centre of gravity of the blocking element. For example, the Z-shaped bending of the blocking element is then advantageously provided in the region of the centre of gravity thereof, or, in other words, the mounting of the blocking element is at the centre of gravity thereof. If any transverse forces occur, then with that embodiment there are virtually no inertia forces in respect of the blocking element iself, which would cause it to be accelerated out of its engagement position.

Figure 2:
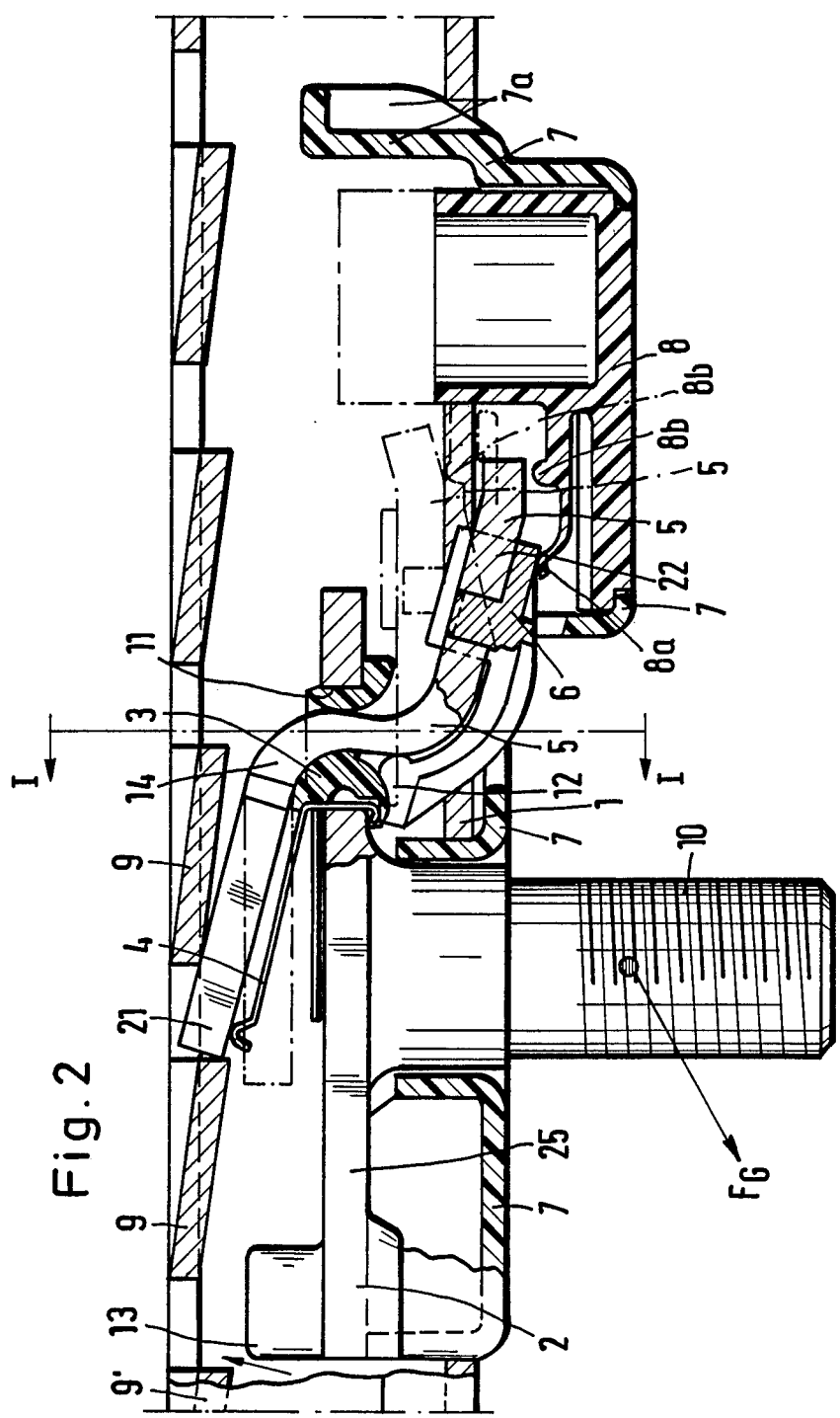
Figure 3:
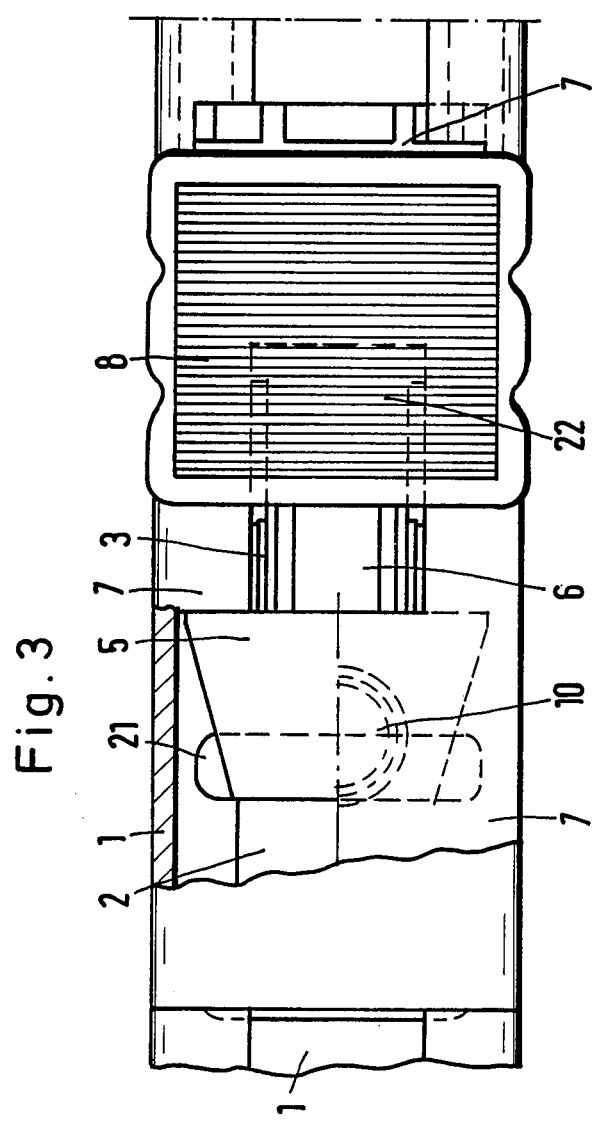
Figure 4:
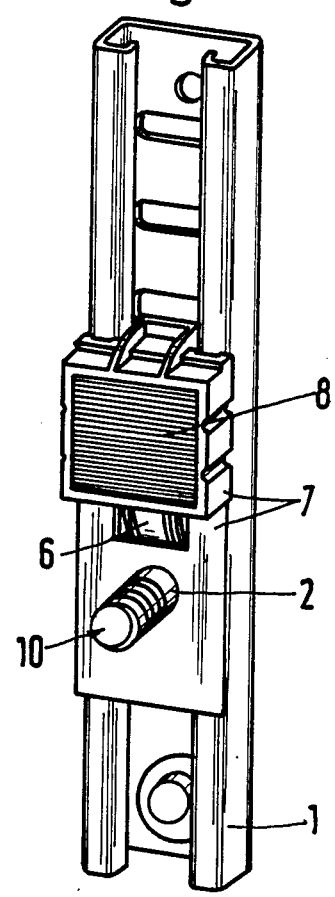
Figure 5A:
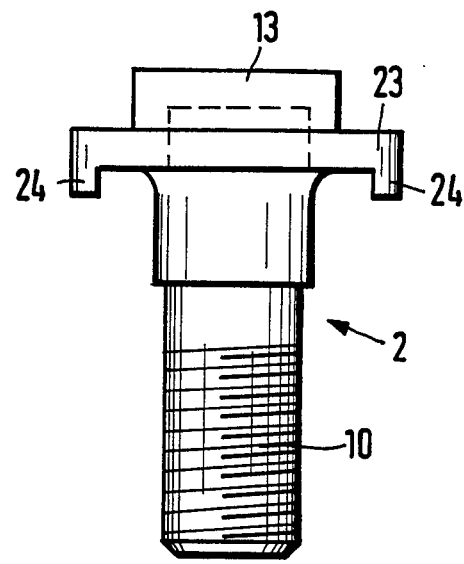
Figure 5C:
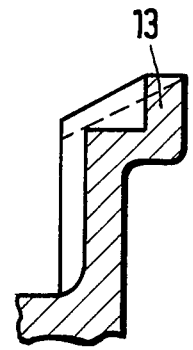
Figure 5B:
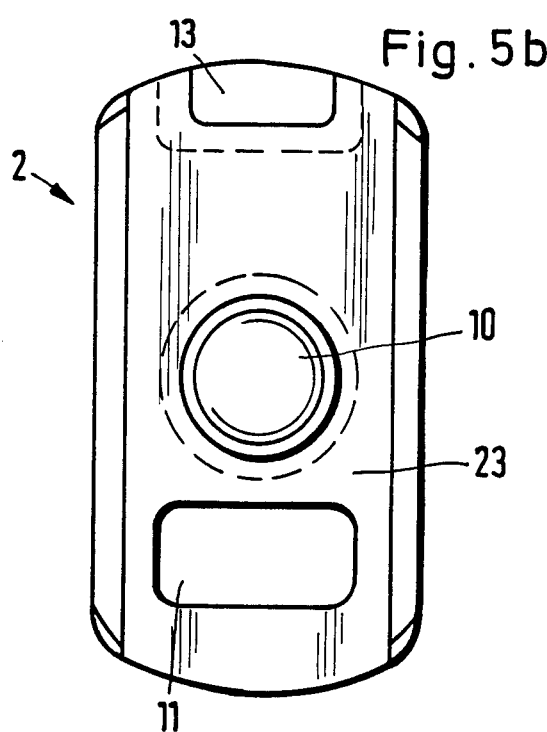
Figure 6:
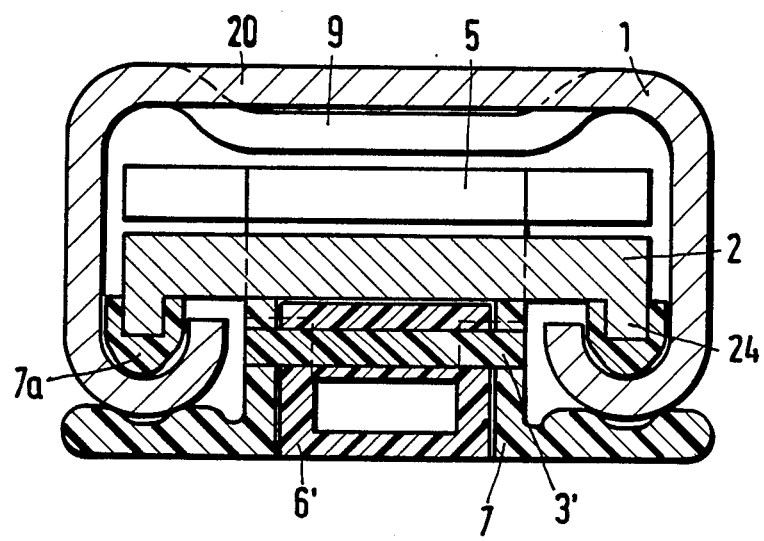

Further advantages, features and possible uses of the present invention will be apparent from the following description of preferred embodiments, in conjunction with the accompanying drawings in which:

FIG. 1 is a double view of a first height adjusting arrangement, partly in cross-section, wherein the left-hand half is a view onto FIG. 2 from the right while the right-hand half is a sectional view taken along line I—I in FIG. 2, FIG. 2 shows a view in longitudinal section through the height adjusting arrangement with blocking element, slide and lock button, FIG. 3 is a broken-away, partly sectional view of FIG. 2 from below, FIG. 4 is a perspective view of the height adjusting arrangement with guide rail, FIG. 5 shows three sectional views of the slide, wherein FIG. 5a is a side view, FIG. 5b is a plan view from the right onto the part in FIG. 5a and FIG. 5c is a detailed view showing the auxiliary tooth, FIG. 6 is a cross-sectional view through a height adjusting arrangement in a second preferred embodiment, similarly to FIG. 1 in relation to the first embodiment, FIG. 7 is a view which is comparable to FIG. 2, more specifically in accordance with the second embodiment, and FIG. 8 is a view comparable to that shown in FIG. 3, but once again showing the second embodiment.

Shown as force-carrying members in almost all the Figures of drawings are the stationary guide rail 1 which is of a double-C-shaped configuration, in which there is guided a slide 2 which is of a U-shaped configuration in cross-section. The cross-section of the slide 2 can be clearly seen in FIGS. 1 and 6. The slide 2 centrally carries a holding pin or bolt 10 which can also be seen from FIGS. 5a and 5b. Furthermore, a blocking element 5 which is shallow in cross-section and of a Z-shaped configuration is fitted through a transverse slot 11 in the slide 2. The other components are essentially not force-carrying components.

In the first embodiment shown in FIGS. 1 to 4, provided in the web portion 20 which connects the C-shaped portions of the guide rail 1, in the longitudinal direction thereof, is a row of arresting teeth 9 and 9'. It will be seen from FIGS. 2 and 4 that disposed between the arresting teeth 9 are openings which however are not necessary, as can be seen from the second embodiment illustrated in FIGS. 6 to 8, in particular FIG. 7.

The blocking element 5 is shown in side view in FIG. 2. It has two substantially straight end limbs 21 and 22, between which the Z-shaped portion is disposed, in the region of the centre of gravity of the blocking elements 5. It is with that middle region that the blocking element 5 is fitted through the opening 11 in the slide 2. It is biased into the detent position by the shaped spring 4. It will be seen how, in the detent position shown in solid lines in FIG. 2, the forces which occur at the moment of an accident, in the longitudinal direction of the blocking element 5, are transmitted to the arresting tooth 9. By virtue of that arrangement it is possible for high forces to be carried transversely (towards the left in FIG. 2) in the longitudinal direction of the guide rail 1, which forces are produced at the pin 10 of the slide 2 by the belt forces which are produced in the direction indicated by the arrow $F_G$.

The region in which the blocking element passes through the slide 2 is formed in the slide by the opening 11 which is in the form of a slot in both embodiments. In the case of the first embodiment shown in FIGS. 1 to 4, a mounting shell portion 3 is disposed in the slot 11 in the slide 2 and provides for pivotally holding the blocking element 5 in position, by way of its first radius 14 which is towards the guide rail 1 and which, at the underside of the element 5, acts like a half shell portion and bears against the mounting shell portion 3. A co-operating mounting portion 6 of plastics material is secured to the blocking element 5 and bears with its front guide projection 12 against the mounting shell portion 3.

FIGS. 5a to 5c shown the U-shaped slide 2 in two different views and with a detail view. Like the blocking element 5, the slide 2 is also of a very simple configuration. The two components do not need any particular requirements in regard to materials. The slide was developed from a screw bolt with a thin head plate portion. That configuration can still be seen approximately in the side view of FIG. 5a. The head plate portion 23 is punched out to a rectangular form as shown in FIG. 5b and, in that respect, the edges 24 which project into the adjacent C-shaped portion of the guide rail 1 are formed by stamping on the slide. In the same working operation, the auxiliary tooth 13 which is shown as a detail in FIG. 5c, and the opening 11 for the blocking element 5 to fit therethrough, are also formed by piercing (in the embodiment shown in FIGS. 6 to 8, the auxiliary tooth 13 is not provided and is not required).

Arranged around the U-shaped slide 2 is a guide housing 7 of plastics material, in which the lock button 8 is also disposed on the frame side shown in FIG. 2. Guide projections 7a which are shown on the left in FIG. 1, for guiding the slide 2, are injection moulded at the ends of the housing 7.

In the first embodiment shown in FIGS. 1 to 4, the lock button 8 is supported by a thin forefinger portion 8a which is easily resiliently movable, against the co-operating bearing portion 6 of the blocking element 5 and, after deformation thereof, it is supported with the main finger portion 8b against the blocking element 5 itself. If the lock button 8 is depressed, if the slide 2 is to be displaced along the guide rail 1, then the forefinger portion 8a firstly presses against the co-operating mounting portion 6 and, after deformation thereof, the main finger portion 8b then presses against the blocking element 5 so that the latter is rotated from the engaged position into the position (opened position) which is shown in broken lines in FIG. 2. The purpose of the forefinger portion 8a is to prevent the lock button 8 from chattering or rattling.

If, at the moment of an accident, in the arrested condition as shown in FIG. 2, a force $F_G$ acts on the fixing bolt 10 in the direction illustrated, then, if that force $F_G$ assumes very high values, it can deform the plastics guide housing 7 of the slide 2 in such a way that the entire slide 2 buckles around the mounting shell 3 of the blocking element 5 whereby the auxiliary tooth 13 comes to lie against a second stamped-out portion 9' (see FIG. 2) in the web portion 20 of the guide rail 1. In that way the security of the locking effect is markedly enhanced.

Reference has already been made hereinbefore to the mounting shell 3 for pivotally mounting the blocking element 5. The plastics co-operating mounting member 6 which is secured to the blocking element 5 completes the defined mounting of the blocking element 5 from the opposite side, that is to say, as shown in FIG. 2, from the right at the right-hand end 22 of the blocking element 5.

Both the first and the second embodiment of the height adjusting arrangement require only a very small number of components, namely the force-carrying members described hereinbefore, which consist of metal, and four plastics components (mounting portions 3, 3', co-operating mounting portions 6, 6', guide housing 7 and lock button 8).

The second embodiment is shown in FIGS. 6 to 8 and comprises numerous components which are identical to those of the first embodiment shown in FIGS. 1 to 4 so that the same reference numerals are used herein, and there is no need for them to be described again.

The difference between the second embodiment, and the first alternative, is that in this case the pivotal mounting of the elongate, shallow blocking element 5 which is bent into a Z-shaped configuration is not by way of a mounting shell with co-operating mounting member, but a rotary axis or spindle 3' which is formed thereon and which is mounted in a co-operating mounting portion 6' disposed on the slide 2. The guide rail 1 only has the arresting teeth 9 stamped or punched out, there are no slots or through-fitting apertures between the individual arresting teeth of the guide rail 1.

The blocking element 5 can be provided with an advantageous supporting action at its back, at the preceding tooth (in FIG. 7, the tooth above the straight end 21). That still further educes any danger of buckling of the blocking element. By virtue of the mounting ring for guiding the rotary spindle 3', the blocking element 5 can also be so precisely guided with respect to the slide 2 that the bent back of the blocking element can be initially guided at the support side of the slot in the slide 2 virtually without play and in an exact fashion. In that way the arrangement provides for a low degree of deformation and a rapid arresting action.

By comparison between the first and second alternatives, it will be seen that the thickness of the sheet metal of the blocking element 5 and its radius of bending in the middle portion which is of a bent Z-shaped configuration, play a greater part in the first embodiment and may give rise to problems in regard to movement in the mounting 3, if poorly manufactured, while in the second embodiment as shown in FIGS. 6 to 8, the construction ensures an exact and geometrically defined point of rotation for the blocking element 5, without encountering problems in regard to tolerance, in relation to the mounting portions in question. In this embodiment, the arrangement is not dependent on the radius of bending and the gauge of the blocking element (tolerance range).

Instead of the shaped spring 4, the arrangement uses a compression spring 4' which can be disposed in the slide 2 and which can be guided and held by way of a projection 26 which is mounted to the left-hand straight end 21 of the blocking element 5.

The lock button 8 is pressed upon actuation in the direction indicated by the arrow 27 whereby the finger 18 is displaced from the position shown in solid lines into the position shown in broken lines in such a way that it comes into engagement with the straight end 22 of the blocking element 5, which is towards the button, and can press the blocking element 5 into the released position.

I claim:

1. A height adjusting arrangement for a guide fitment which is preferably disposed on the door post of a motor vehicle for safety belts, comprising a stationary guide rail (1) of double-C-shaped configuration, a slide (2) which is slidable along the guide rail and to which the guide fitment can be mounted, and a blocking element (5) which latches the slide (2) to the guide rail (1 and extends through an opening (11) in the slide (2), characterised in that a row of arresting teeth (9, 9') is formed longitudinally of the web portion (20) which connects the C-shaped portions of the guide rail (1) against which one end (21) of the blocking element (5) disposed substantially within the guide rail (1) can be engaged, and which at the other end (22) can be brought into enagement with a lock button (8), and that the slide (2) is of substantially U-shaped cross-section, wherein the free limbs of the U-shape are guided in the respective C-shaped portion of the guide rail (1).

2. An arrangement according to claim 1 characterised in that the blocking element (5) has two substantially straight end limbs (21, 22), is shallow and Z-shaped in cross-section, and is mounted pivotally in the region (11) in which it passes through the slide (2).

3. An arrangement according to claim 1 or clam 2 characterised in that the blocking element (5) has a co-operating mounting portion (6') through which a rotary spindle (3') is fitted, which is supported in a further co-operating mounting portion of the guide housing (7) on the slide (2).

4. An arrangement according to claim 1 or claim 2 characterised in that the radius (14) of the blocking element (5), which is towards the guide rail (1), is at its underside a half shell portion for a mounting shell (3) which is fitted into a slot (11) in the slide (2) and that the end limb (22) of the blocking element (5), which is remote from the guide rail (1), carries a co-operating mounting portion (6) of plastics material.

5. An arrangement according to claim 1 characterised in that mounted to the end (25) of the slide (2), which is in opposite relationship to the slot (11), is an auxiliary tooth (13) which sticks out towards the guide rail (1) and which comes to lie between two arresting teeth (9).

6. An arrangement according to claim 1 characterised by a spring (4) disposed between the slide (2) and the blocking element (5), for biasing the blocking element (5) into the engaged position.

7. An arrangement according to claim 1 characterised in that a guide housing (7) of plastics material is arranged around the slide (2) and has a holder for accommodating the movable lock button (8) with actuating projections (8a, 8b) which can be brought into engagement with the blocking element (5).

8. An arrangement according to claim 1 characterised in that the pivotal mounting (3; 3') of the blocking element (5) is arranged in the region of its centre of gravity.

* * * * *